Nov. 2, 1965  P. A. HOFFMAN  3,216,002
HIGH SPEED CONVERTER
Filed Nov. 15, 1960  5 Sheets-Sheet 1

INVENTOR
Philip A. Hoffman
BY Diggins & Le Blanc
ATTORNEYS

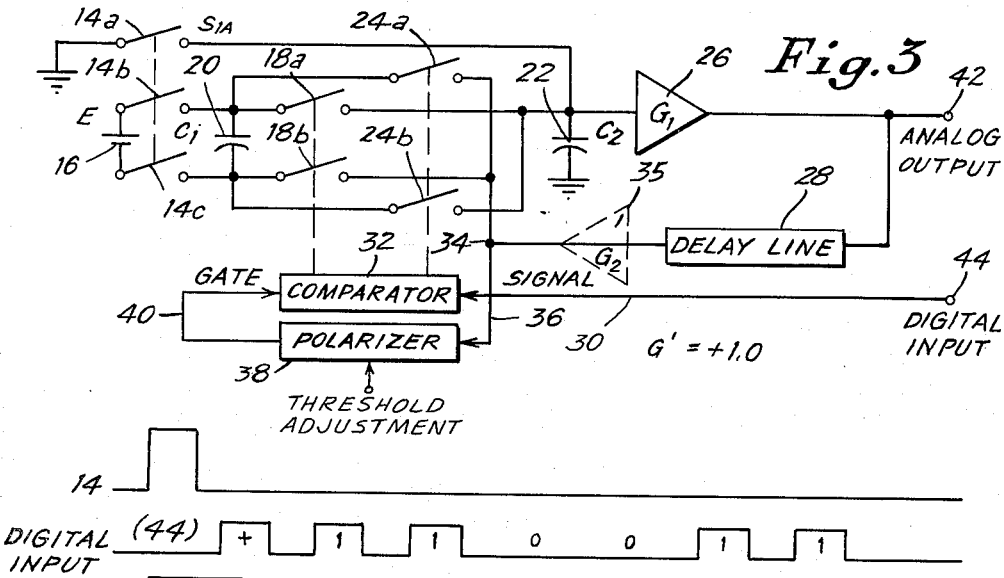

INVENTOR
*Philip A. Hoffman*
BY *Diggins & LeBlanc*
ATTORNEYS

Nov. 2, 1965          P. A. HOFFMAN          3,216,002
                    HIGH SPEED CONVERTER
Filed Nov. 15, 1960                        5 Sheets-Sheet 4

INVENTOR
Philip A. Hoffman
BY Diggins & Le Blanc
ATTORNEYS

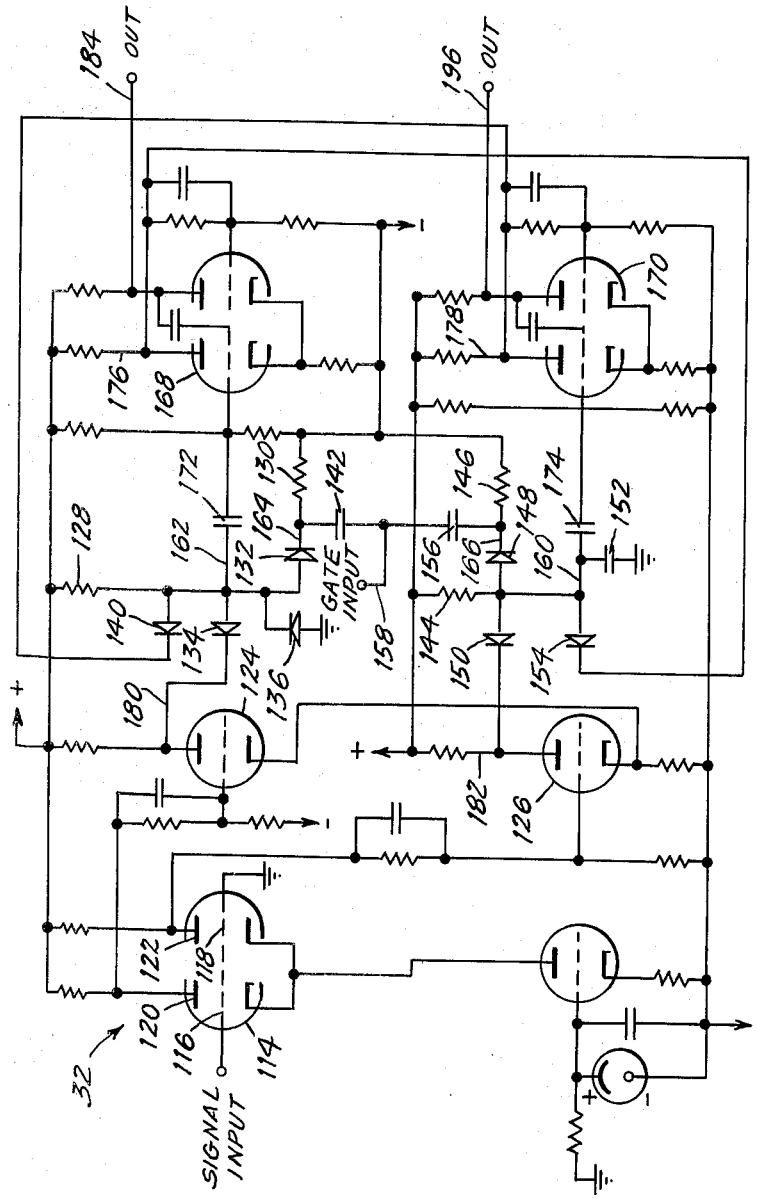

United States Patent Office 3,216,002
Patented Nov. 2, 1965

3,216,002
HIGH SPEED CONVERTER
Philip A. Hoffman, Towson, Md., assignor to Hoffman and Eaton, Towson, Md., a partnership
Filed Nov. 15, 1960, Ser. No. 69,458
15 Claims. (Cl. 340—347)

This application is a continuation-in-part of copending application No. 25,343, filed April 28, 1960 now Patent No. 3,098,224.

This invention relates to a reversible electrical analog to digital converter and more particularly to a high speed converter wherein the trial voltages or analog output voltages are generated by the exchange of electrical charge between capacitors.

Analog to digital converters and digital to analog converters are well known. They are useful in a wide variety of applications such as in the field of telemetry for transferring the analog output of various types of transducers such as accelerometers, air speed meters and the like into electrical pulses and for converting electrical pulses into analog quantities which represent the original information measured. Converters are also used for voice encoding and for voice communication in which application they provide a communication system having superior fidelity and other desirable characteristics over comparable systems. Also coming into use are converters for electrically driven machinery and particularly for machine tools.

The present invention provides a reversible electronic converter of greatly simplified construction. No programmer is required since the converter is self-stopping and a complete converter can be packaged in an extremely small space. The high speed operation makes a substantially reduced demand on the amplifier circuits so that the converter exhibits low energy consumption and only low supply voltages are required. An important feature of the present invention is its wide adaptability to various inputs and outputs in conjunction with its complete reversibility through an extremely simple switch arrangement. The individual analog to digital and digital to analog converter units may be used together or may be used independently with other outside circuits such as analog computers, digital computers and various memory devices and the like and may additionally be employed in conjunction with portions of existing inscriber and outscriber equipment used with large digital computers.

An important feature of the converter of the present invention contributing to its reversible nature is the fact that the converter operates on the most significant digit first.

It is therefore a primary object of the present invention to provide a novel high speed converter.

Another object of the present invention is to provide a converter of relatively simplified construction requiring only a very small space.

Another object of the present invention is to provide a reversible analog to digital and digital to analog converter.

Another object of the present invention is to provide a self-stopping converter requiring no programmer.

These and other objects and advantages of the invention will be more apparent upon reference to the following specification, claims and appended drawings wherein:

FIGURE 3 shows the converter of the present invention connected up for digital to analog conversion;

FIGURE 4 shows the timing and signal voltages for the converter connection of FIGURE 3;

FIGURE 9 shows a comparator usable in the converter of FIGURES 1 and 3.

Figure 1:
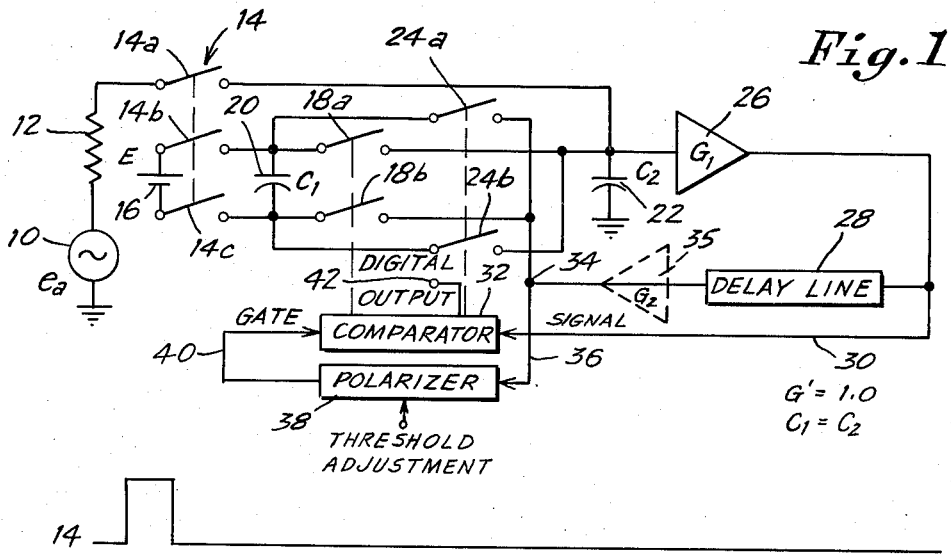
FIGURE 1 shows the overall converter of the present invention connected up for analog to digital conversion.

Referring to the drawings, FIGURE 1 is a block diagram of the overall converter of the present invention connected for analog to digital conversion. This same basic converter circuit may be used for digital to analog conversion through a few simple changes easily accomplished by a manual switching arrangement. The same converter connected up for digital to analog conversion is illustrated in FIGURE 3 and more fully discussed below.

In FIGURE 1, a source of analog voltage 10 is connected through a coupling impedance 12 to section 14a of a three element ganged switch generally indicated at 14. Connected to sections 14b and 14c of the switch is a D.C. reference voltage source 16. The analog voltage 10 may be anything from a D.C. voltage to a relatively high frequency A.C. signal. The upper limit of the frequency of analog voltage which may be converted is determined by the speed of operation of the converter and in fact may be quite high.

Connected to switches 14b and 14c are a second set of ganged switches 18a and 18b and connected between the first and second set of switches is a capacitor 20 labeled $C_1$. Capacitor 20 is connected through switch 18a to a second capacitor 22 labeled $C_2$. The opposite side of capacitor 22 is grounded as indicated. Ganged reversing switches 24a and 24b reverse the connection between capacitors 20 and 22. As can be seen, the closure of switches 18a and 18b connects the upper plate of capacitor 20 through switch 18a to the upper plate of capacitor 22. Alternatively, closure of reversing switches 24a and 24b connects the lower plate of capacitor 20 through switch 24b to the upper plate of capacitor 22.

Connected to the output of capacitor 22 is an amplifier 26. The output of the amplifier is supplied to a delay line 28 and also by way of lead 30 to one side of a comparator 32. The output of delay line 28 passes to a junction 34 which connects to switches 18b and 24a and which also connects by way of lead 36 to a polarizer 38. An additional amplifier indicated by dashed lines at 35 may be connected between delay line 28 and junction 34. The additional isolation afforded by the second amplifier may be desirable for some converter applications. The polarizer supplies a gating signal by way of lead 40 to gate the comparator into operation. The digital output is taken from the comparator at terminal 42.

Figure 2:
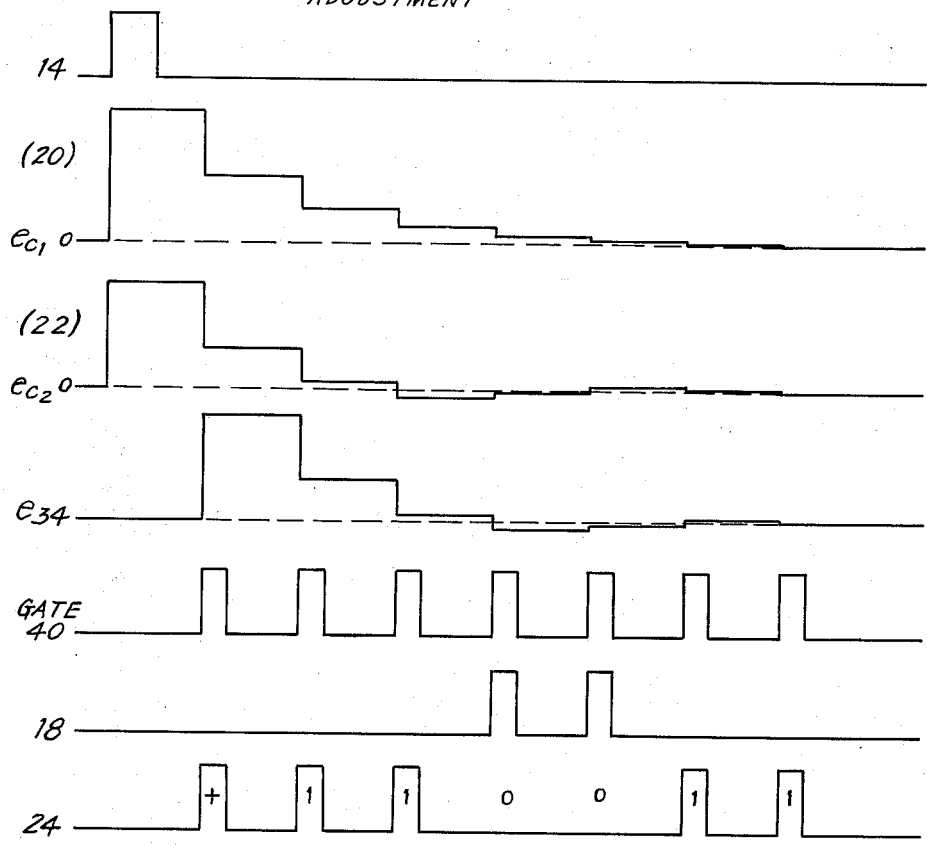
FIGURE 2 shows the timing and signal voltages for the converter of FIGURE 1.

FIGURE 2 shows the switch timing pulses and signal voltages that exist in the converter of FIGURE 1 when the analog input voltage $e_a$ is equal to +110011. Switches 14a, 14b and 14c are closed in synchronism at the start of each new encoding period. They are closed for a time less than the duration of one digit interval and are not closed again during that encoding period. Closure of this triple switch 14 charges capacitor 20 to the internal standard potential E of source 16 and charges capacitor 22 to the analog input voltage $e_a$. The voltage $e_a$ multiplied by $G'$ the gain of amplifier 26 in series with delay line 28 appears at junction 34 at the output of the delay line one digit interval after the start of the encoding period. $G'$ is a positive quantity and is defined as the voltage gain from the input terminal of amplifier 26 to the output of the delay line at junction 34. In FIGURE 1, $G'$ equals 1.0 and capacitor $C_1$ equals capacitor $C_2$.

The transient caused at junction 34 when the delayed wave front $e_a$ arrives causes the polarizer to gate the comparator so that switch 18 is closed if $e_a$ is negative and switch 24 is closed if $e_a$ is positive. Closure of either switch 18 or switch 24 causes precisely one-half of the charge on capacitor 20 to be transferred to capacitor 22 provided the gain G' from capacitor 22 to junction 34 equals 1.0 and the capacitors are equal. The comparator 32 is arranged so that if the voltage at the output of amplifier 26 is positive, switch 24 is closed, and if the amplifier output voltage is negative, switch 18 is closed.

Closure of either switch 18 or 24 causes a new wave front at the input to the delay line which appears at junction 34 one digit interval later. When this wave front arrives at junction 34, the polarizer 38 supplies another gating pulse to the comparator. The function of the polarizer is to provide a gating pulse to the comparator of constant polarity regardless of whether the step in voltage at the output of the delay line is positive or negative. The comparator, when gated, closes switch 18 if the voltage across capacitor 22 is negative or, alternatively, closes switch 24 if the voltage across capacitor 22 is positive.

The above process continues and the voltage across capacitor 22 approaches zero as the binary encoding progresses in the manner illustrated by the timing and signal voltages shown in FIGURE 2. Each of the succeeding steps in the voltage across capacitor 22 is one-half as large as the preceding step. The control pulses to switch 24 indicate the magnitude of the analog input voltage 10 in serial binary form with the sign and most significant digit indicated first in the wave form 24 shown in FIGURE 2. If a pulse is present in the first pulse position, the analog input is a positive quantity, and succeeding pulses express the magnitude of $e_a$ in binary form. If a pulse is not present in the first pulse position, $e_a$ is a negative quantity and the succeeding pulses express the one's complement of the magnitude of $e_a$. It is apparent that the control pulses to switches 18 and 24 have an inverse relationship, i.e., when a pulse is present at switch 24 in the first pulse position, $e_a$ is positive and succeeding pulses represent the binary equivalent of the magnitude of $e_a$. If a pulse is not present at switch 24 in the first pulse position, $e_a$ is negative and succeeding pulses represent the one's complement of the magnitude of $e_a$. Another method of regarding the subject is to consider that the pulse trains represented by lines 18 and 24 in FIGURE 2 are one's complements. When the analog input voltage is negative, a pulse in the first pulse position to switches 18a and 18b signifies a negative polarity, and succeeding pulses represent the magnitude of the analog input voltage. Conversely, a no-pulse in the two switches 18a and 18b first pulse position signifies a positive polarity, and succeeding pulses represent the one's complement of the digital equivalent of the magnitude of analog input. Converse statements may be made with respect to the pulse train to switches 24a and 24b.

The conversion system of FIGURE 1 is extremely simple and operates at high speed, imposing very little demand upon the amplifiers and voltage sources. No programmer is required since, after the triggering of switch 14, the serial binary conversion proceeds automatically until the voltage steps at the output of the delay line 28 are two small to operate the polarizer. This then stops the conversion. The number binary digits produced can be controlled by adjusting the voltage threshold of the polarizer 38.

The accuracy of the conversion does not depend primarily on the band width of the delay line because the wave fronts into the delay line are reconstituted at each digit interval by the closing of switch 18 or 24.

FIGURE 3 shows the converter of FIGURE 1 connected up for digital to analog conversion. Similar parts bear like reference numerals. The only changes involve the connection of switch 14a directly to ground, the connection of an analog output terminal 42 to the output of amplifier 26 and the connection of a digital input terminal 44 to comparator input lead 30. It is apparent that these simple terminal changes in no way change the basic operation of the system and may be brought about by a simple manual switching arrangement as changes in the function of the system between analog to digital conversion on the one hand and digital to analog conversion on the other hand are desired. At the end of the encoding period illustrated in FIGURE 4 by the timing and signal voltages for the converter connections of FIGURE 3, the analog equivalent of the digital input signal exists at the analog output terminal 42. The digital input at terminal 44 is illustrated as +110011.

Figure 5:
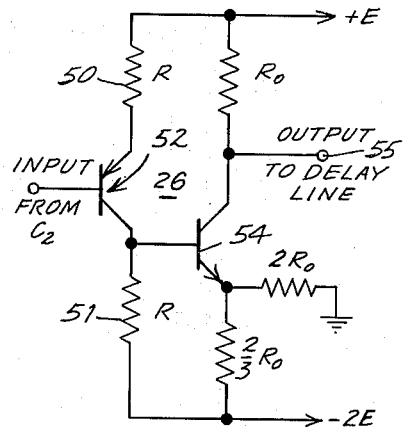
FIGURES 5 and 5A show the details of the amplifiers utilized in the converter of FIGURES 1 and 3.
Figure 5A:
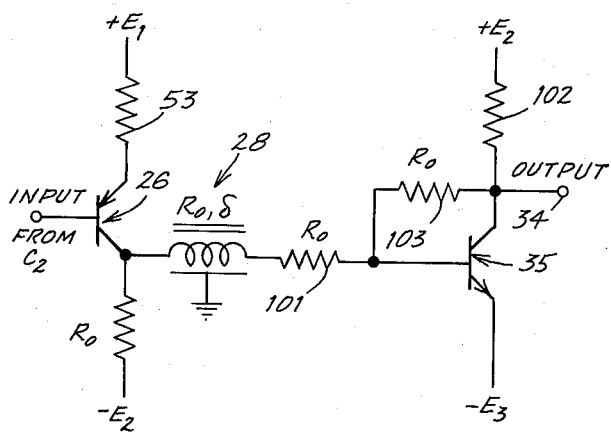

FIGURES 5 and 5A show the details of the amplifiers 26 and 35 in FIGURES 1 and 3. In FIGURE 5, amplifier 26 takes the form of a two stage base input transistor circuit with the emitter of the first stage transistor 52 connected through supply resistor 50 to a source of positive potential +E. The collector terminal is connected through resistor 51 to a source of negative potential —2E and to the base input of second stage transistor 54. Output to the delay line is from the collector of transistor 54. The other end of the delay line is, of course, terminated in its characteristic impedance $R_0$.

The amplifier of FIGURE 5 has an open circuit voltage gain from the input terminal to the output terminal 55 of +2.0 and an output impedance of $R_0$. Thus when connected to the properly terminated delay line of characteristic impedance $R_0$, the overall gain of the amplifier and delay line combination is +1.0.

In FIGURE 5A, amplifier 26 comprises a single transistor stage with emitter connected through coupling resistor 53 to a positive source of potential $+E_1$. The collector is coupled through a characteristic impedance $R_0$ to a negative potential $—E_2$ and to delay line 28 having a characteristic impedance $R_0$ and a delay time δ. The delay line is coupled through an impedance 101 equal to its characteristic impedance $R_0$ to the base input transistor amplifier 35. A coupling resistor 102 connects the collector terminal of the transistor to a source of positive potential $+E_2$ while the emitter is connected to a source of negative potential $—E_3$. A second impedance 103 equal to the delay line characteristic impedance is connected between the transistor collector and base. Through the choice of a suitable value for supply resistor 102, the delay line is effectively terminated at both ends in its characteristic impedance.

While FIGURE 5A shows a preferred delay line embodiment it is apparent that a distributed amplifier type delay system can be readily substituted for the amplifier and delay line. Likewise it is within the scope of this invention to utilize a mechanical delay element such as a piezoelectric or magnetostrictive bar coupled to electromechanical input and output transducers for the amplifier and delay systems.

Figure 6:
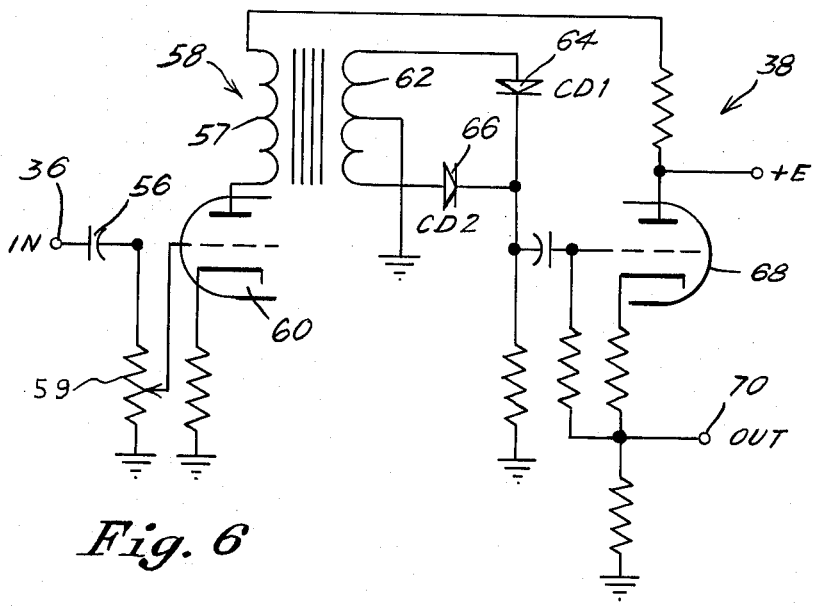
FIGURE 6 shows the details of the polarizer utilized in the converter of FIGURES 1 and 3.

FIGURE 6 shows the polarizer 38. The input signal from line 36 to the polarizer comes from the output of the delay line. The coupling capacitor 56 connected to the output terminal of the polarizer serves to differentiate the wave fronts out of the delay line. These positive or negative pulses are applied to the primary 57 of pulse transformer 58 through one-half 60 of a twin triode. Threshold adjustment is provided by a variable gain potentiometer 59. The primary of transformer 58 is coupled in the plate circuit of amplifier 60. The secondary 62 of pulse transformer 58 is center tapped and the center tap is connected to ground. When a step wave front exists at the input terminal 36 to the polarizer, a positive pulse will occur at the anode of either diode 64 or diode 66 depending upon whether the input wave front is positive or negative. The positive pulse is transmitted through one or the other of the diodes to the triode amplifier 68. Thus when a step wave front of either polarity occurs at the input terminal 36 of the polarizer, a positive pulse will occur at the output terminal 70 and will appear on lead 40 shown in FIGURES 1 and 3.

Figure 7:
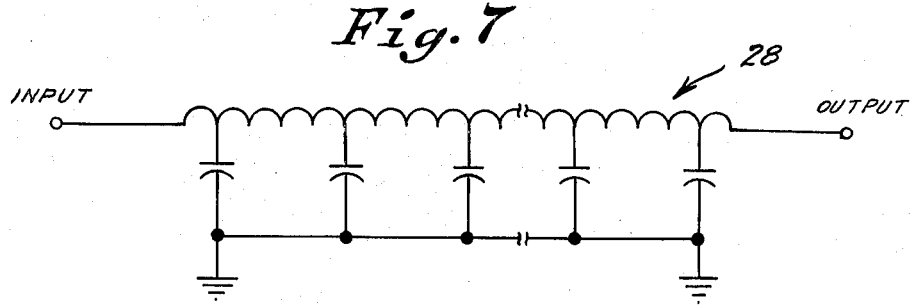
FIGURE 7 shows a typical delay line usable in the converter of FIGURES 1 and 3.

FIGURE 7 shows a schematic diagram of a typical lumped-parameter electrical delay line 28 usable in the converter of FIGURES 1 and 3. The center portion of the delay is shown broken away to indicate that the length of the delay line and hence the period of delay may be varied as desired and determines the digit period of the converter system. The length of delay line is chosen so that the wave front of the last digit or bit period occurs one digit period later at the junction point 34 of the converter. Many other forms of delay lines may be used in various applications.

Figure 8:
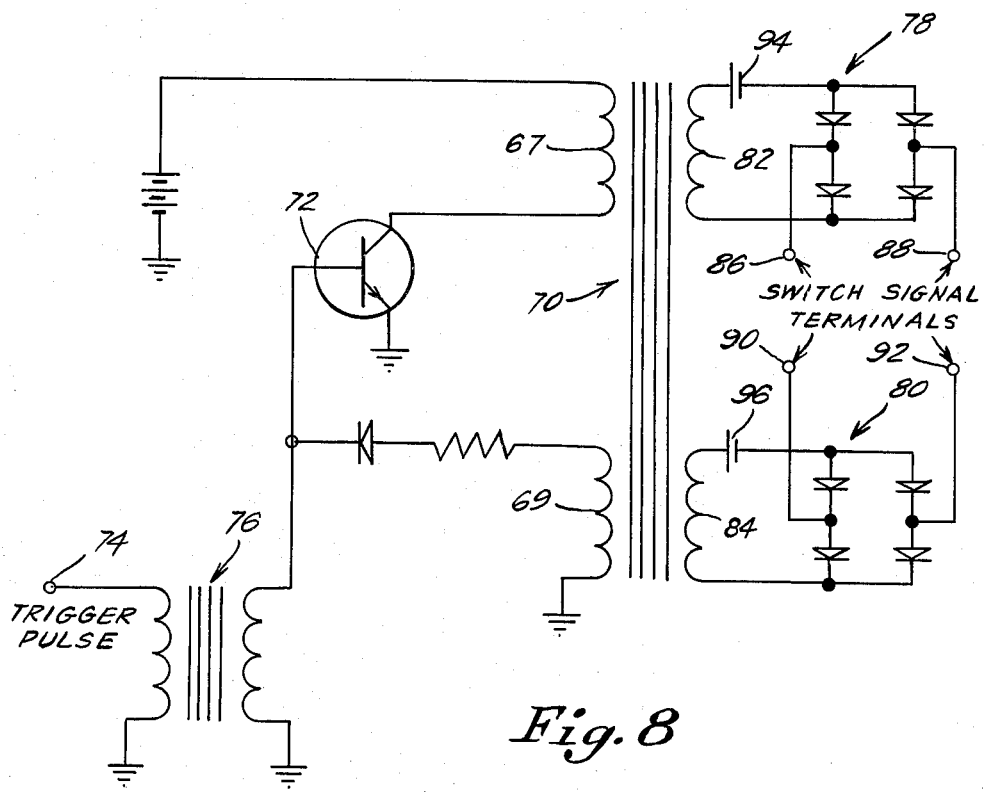
FIGURE 8 shows a dual switch usable in the converter of FIGURES 1 and 3.

FIGURE 8 is a schematic diagram of a dual switch suitable for use as one of the switches 18 or 24 in FIG- UES 1 and 3. It is apparent that by adding an extra secondary to the transformer and an additional battery and diode bridge, the switch shown in FIGURE 8 can be converted to a triple element switch suitable for use as switch 14 in FIGURES 1 and 3.

The primary windings 67 and 69 of pulse transformer 70, the transistor 72 and the remaining components immediately associated with the transistor 72 form a blocking oscillator which operates upon receipt of a trigger pulse at terminal 74 connected to the primary of input pulse transformer 76. When the blocking oscillator including transistor 72 fires, current is circulated in the four-diode bridge circuits 78 and 80 connected to separate secondaries 82 and 84 of blocking oscillator pulse transformer 70. Firing of the blocking oscillator causes the diode bridges 78 and 80 to conduct and connects terminal 86 to terminal 88 terminal 90 to terminal 92 through the low resistance paths of the conducting diodes in the arms of each bridge. When the blocking oscillator turns off the battery 94 or 96 in series with the respective diode bridge serves to hold the diode bridge in the off condition until the blocking oscillator fires again upon receipt of another trigger pulse.

FIGURE 9 shows a typical comparator 32 usable in the conversion circuits of FIGURES 1 and 3. Double triode 114 acts as a differential amplifier. The signal input to the comparator from either amplifier 26 or from digital input terminal 44 is impressed on grid 116 and grid 118 is grounded. A positive voltage on grid 116 results in a relatively low voltage on anode 120 and a relatively high voltage on anode 122. The circuit elements and power supply voltages are designed so that a small positive voltage on grid 116 cuts off the anode current in triode 124. Similarly, a small negative voltage on grid 116 cuts off the anode current in triode 126.

The gate circuit for triode 124 includes resistors 128 and 130 and diodes 132, 134, 136, 140 and capacitor 142. Likewise, the gate circuit for triode 126 includes resistors 144 and 146 and diodes 148, 150, 152, 154 and capacitor 156. The gate pulses are applied to wire 158 from which they actuate the gate circuits through blocking capacitors 142 and 156. An output pulse is obtained from wire 160 when the voltage on grid 116 is positive and from wire 162 when the voltage on grid 116 is negative, as will be explained in the following paragraph. A further requirement for the construction of the circuit elements and power supply voltage is that the anodes of triodes 124 and 126 must be at ground potential when grid 116 is at ground potential. Moreover, wires 164 and 166 preferably should be at ground potential when grid 116 is at ground potential. The monostable multi-vibrators employing dual triodes 168 and 170 are coupled to the pulses on wires 160 or 162 by capacitors 172 and 174. These monostable multi-vibrators convert the pulses on wires 160 or 162 into waves having square or other suitable shapes to operate the switches to which they are connected. Monostable multi-vibrators are, of course, well known.

Prior the the occurrence of a gating pulse on wire 158, both monostable multi-vibrators are in their stable states and the left hand sections of dual triodes 168 and 170 are cut off and their right hand sections are conducting. Thus the potentials at wires 176 and 178 and at the cathodes of diodes 140 and 154 are equal to the positive supply voltage.

It will now be assumed that a positive voltage is applied to grid 116. In accordance with the previous explanation, the anode current of triode 124 is cut off and furthermore the anode current of triode 126 is high. Therefore the potential on wire 180 is the same as the positive power supply voltage, that is to say, highly positive with respect to ground. Moreover, the high current in triode 126 causes the potential on wire 182 to be substantially negative with respect to ground. Under these conditions, diodes 134 and 140 are cut off and diodes 132 and 136 are conducting. On the other hand, diodes 150, 148 and 152 are conducting and diode 154 is cut off. If a positive pulse of siutable magnitude is applied to wire 158, a positive pulse will appear on wire 162 since diode 132 will remain conducting until the potential of wire 164 is higher than the positive power supply voltage, However, diode 148 will become non-conducting because its cathode goes positive and therefore no voltage will appear on wire 160.

The pulse on wire 162 will be coupled to the left hand section of dual triode 168 causing the upper monostable multi-vibrator to trigger to its unstable state and produce a positive output pulse at terminal 184. Simultaneously, the poteneial at point 176 which is connected to the cathode of diode 154 will drop to a low value and prevent a pulse from occurring at wire 160 in the event that the potential at grid 116 changes to a negative polarity during the gating impluse at wire 158. The monostable multi-vibrators are designed so that the duration of their unstable states are at least equal to the durations of the gating impulses at wire 158 and not greater than the period between successive gating pulses.

From a similar line of reasoning, it is clear that a pulse will occur on wire 160 when grid 116 is negative with respect to ground and the monostable multi-vibrator consisting of dual triode 170 will prevent a signal from appearing at wire 162 during the same gating impulse. The output then appears on terminal 186. Diodes 136 and 162 serve as clamps which prevent wires 160 and 162 from going negative with respect to ground.

From the above, it is apparent that the present invention provides a novel electronic converter which operates at high speeds and which is essentially reversible in nature since it operates on the most significant digit first. The high speed is made possible through the use of a delay line in combination with a polarizer for gating the comparator circuit. The delay line and polarizer constitute important features insofar as the automatic operation of the circuit is concerned in that the polarizer threshold voltage provides automatic shutoff of the converter. The number of digits encoded may be controlled by varying the voltage gain of the polarizer. As a result of the automatic shutoff feature, programmers for the converter are not required and an analog to digital conversion automatically results upon a single energizing input trigger to the circuit of FIGURE 1. It is possible to accomplish several million seven bit encodings per second. One complete converter package requiring approximately 15 transistors can be packaged through miniaturization techniques in approximately a one cubic inch space. The high speed of operation is, for some applications, highly desirable and the simplified circuitry makes much less of a demand on the amplifiers and power supplies as compared to prior converters.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing de-

What is claimed and desired to be secured by United States Letters Patent is:

1. A signal generator comprising first and second charge sharing capacitors, means for producing a reference charge on said first capacitor, switch means for periodically connecting said first and second capacitors together in charge sharing relation, a delay line coupling the voltage ocross said second capacitor back to said first capacitor, comparator means for energizing said switch means in response to changes in the input to said delay line, and a polarizer coupled between said delay line and said comparator means for supplying a single polarity input signal to said comparator means.

2. A single converter comprising first and second charge sharing capacitors, means for producing a reference charge on said first capacitor, a reversing switch for periodically connecting said first and second capacitors together in charge sharing relation, said reversing switch alternatively connecting said capacitors in either charge adding or charge substracting relation, a delay line coupling the voltage across said second capacitor back to said first capacitor, and comparator means for energizing said switch to one of said alternative connecting relations in accordance with the value of a signal to the input of said comparator.

3. A converter according to claim 2 wherein said comparator input is coupled to the input of said delay line.

4. A converter according to claim 2 wherein said comparator input is coupled to a digital input terminal.

5. A signal generator comprising first and second charge sharing capacitors, means for producing a reference charge on said first capacitor, a reversing switch for periodically connecting said first and second capacitors together in charge sharing relation, said reversing switch alternatively connecting said capacitors in either charge adding or charge subtracting relation, passive delay means coupling the voltage across said second capacitor back to one side of said first capacitor, a comparator coupling the voltage across said second capacitor to said switch means, said comparator energizing said reversing switch into charge transferring relation, and a polarizer coupling the output of said delay means to said comparator, whereby said polarizer supplies a gating signal to energize said comparator.

6. A signal generator according to claim 5 wherein the charge transferring relationship of said reversing switch connection is determined by the polarity of the voltage across said second capacitor as sensed in said comparator.

7. A signal generator according to claim 6 wherein said polarizer transmits a gating signal to said comparator only upon a change in the output signal from said delay means.

8. A signal generator according to claim 1 wherein said polarizer supplies a constant polarity gating pulse to said comparator irrespective of the polarity of the change in the output of said delay means.

9. A signal generator comprising first and second charge sharing capacitors, means for producing a reference charge on said first capacitor, a reversing switch having a first section for connecting said charge sharing capacitors in charge adding relationship and having a second section for connecting said charge sharing capacitors in charge subtracting relationship, a delay line coupling the voltage across said second capacitor back to one side of said first capacitor, a comparator for alternatively energizing one of said switch sections, means coupling the voltage across said second capacitor to said comparator whereby said comparator energizes one or the other of said switch sections depending upon the polarity of said second capacitor voltage, and signal processing means coupling the ouput from said delay line to said comparator, said processing means acting to supply a comparator energizing gating pulse to said comparator in response to a change in the output signal from said delay line.

10. A signal generator according to claim 9 wherein said first and second capacitors are of equal capacitance.

11. A signal generator according to claim 9 wherein said signal processing means comprises a polarized supplying a constant polarity gating pulse to said comparator.

12. A signal generator according to claim 11 wherein said polarizer includes variable gain means for controlling the number of bits in an encoding period.

13. An analog to digital converter comprising first and second charge sharing capacitors, means for producing a reference charge on said first capacitor, a reversing switch having a first section for connecting said charge sharing capacitors in charge adding relationship and having a second section for connecting said charge sharing capacitors in charge subtracting relationship, a delay line coupling the voltage across said second capacitor back to one side of said first capacitor, a comparator for alternatively energizing one of said switch sections, means coupling the voltage across said second capacitor to said comparator whereby said comparator energizes one or the other of said switch sections depending upon the polarity of said second capacitor voltage, signal processing means coupling the output from said delay line to said comparator, said processing means acting to supply a comparator energizing gating pulse to said comparator in response to a change in the output signal from said delay line, means for connecting an analog signal to be converted to said second capacitor, and digital output means coupled to said comparator.

14. A converter according to claim 13 including switch means for simultaneously applying said reference signal to said first capacitor and said analog signal to said second capacitor at the beginning of an encoding period.

15. A digital to analog converter comprising first and second charge sharing capacitors, means for producing a reference charge on said first capacitor, a reversing switch having a first section for connecting said charge sharing capacitors in charge adding relationship and having a second section for connecting said charge sharing capacitors in charge subtracting relationship, a delay line coupling the voltage across said second capacitor back to one side of said first capacitor, a comparator for alternatively energizing one of said switch sections, digital input means coupled to said comparator whereby said comparator energizes one or the other of said switch sections depending on the polarity of the digital input, signal processing means coupling the output from said delay line to said comparator, said processing means acting to supply a comparator energizing gating pulse to said comparator in response to a change in the output signal from said delay line, and analog output means coupled to the output from said second capacitor.

References Cited by the Examiner

UNITED STATES PATENTS

| | | | |
|---|---|---|---|
| 2,729,812 | 1/56 | Jahn | 340—347.1 |
| 2,932,017 | 4/60 | Prince | 340—347 |

MALCOLM A. MORRISON, *Primary Examiner.*

IRVING L. SRAGOW, *Examiner.*

UNITED STATES PATENT OFFICE
CERTIFICATE OF CORRECTION

Patent No. 3,216,002                           November 2, 1965

Philip A. Hoffman

It is hereby certified that error appears in the above numbered patent requiring correction and that the said Letters Patent should read as corrected below.

Column 5, line 6, after "delay" insert -- line --; lines 15 and 16, for "FIGUES" read -- FIGURES --; same column 5, line 74, for "the", first occurrence, read -- to --; column 6, line 18, for "siutable" read -- suitable --; line 29, for "poteneial" read -- potential --; line 44, for "162", first occurrence, read -- 152 --; column 7, line 11, for "ocross" read -- across --; line 17, for "single" read -- signal --; same column 7, line 23, for "substracting" read -- subtracting --; column 8, line 12, for "polarized" read -- polarizer --.

Signed and sealed this 25th day of October 1966.

(SEAL)
Attest:

ERNEST W. SWIDER
Attesting Officer

EDWARD J. BRENNER
Commissioner of Patents